United States Patent
Wilson

(10) Patent No.: US 9,713,819 B1
(45) Date of Patent: Jul. 25, 2017

(54) SHIELD FOR A RIM OF A VEHICLE WHEEL

(71) Applicant: Johnny Wilson, Raleigh, NC (US)

(72) Inventor: Johnny Wilson, Raleigh, NC (US)

( * ) Notice: Subject to any disclaimer, the term of this patent is extended or adjusted under 35 U.S.C. 154(b) by 0 days.

(21) Appl. No.: 15/209,933

(22) Filed: Jul. 14, 2016

(51) Int. Cl.
*B60B 7/00* (2006.01)
*B05B 15/04* (2006.01)
*B60B 7/04* (2006.01)
*B60S 3/04* (2006.01)

(52) U.S. Cl.
CPC ........ *B05B 15/0487* (2013.01); *B60B 7/0073* (2013.01); *B60B 7/04* (2013.01); *B60S 3/042* (2013.01); *B60B 2900/211* (2013.01)

(58) Field of Classification Search
CPC ......... B60B 7/068; B60B 7/0073; B60B 7/04; B60B 7/14; B60B 2900/211; B60S 3/042; B05B 15/0487
USPC ............ 301/37.103, 37.104, 37.166, 37.101, 301/37.102, 37.105, 108.1, 111.3
See application file for complete search history.

(56) References Cited

U.S. PATENT DOCUMENTS

| | | | |
|---|---|---|---|
| 2,975,447 A * | 3/1961 | Vuchinas | B60S 3/042 15/53.4 |
| 4,955,670 A | 9/1990 | Koller | |
| 6,227,623 B1 * | 5/2001 | Bellow | B05B 15/0487 118/504 |
| 6,457,780 B1 | 10/2002 | Ernst | |
| D486,438 S | 2/2004 | Tuck et al. | |
| 6,692,085 B1 | 2/2004 | Threadgill | |
| 6,863,353 B1 | 3/2005 | Buckner | |
| 6,895,980 B2 * | 5/2005 | Rosborough | B60S 3/042 134/123 |
| D528,963 S | 9/2006 | Horn | |
| D537,401 S | 2/2007 | Jones | |
| 8,668,277 B2 * | 3/2014 | Santana | B60B 7/04 301/37.104 |
| 2003/0201666 A1 * | 10/2003 | Artessa | B05B 15/0487 301/37.103 |
| 2007/0013226 A1 * | 1/2007 | Updegraph | B60B 7/0073 301/37.104 |
| 2008/0024002 A1 | 1/2008 | Guthrie | |
| 2008/0136247 A1 * | 6/2008 | Janty | B60B 7/061 301/37.104 |
| 2010/0090386 A1 * | 4/2010 | Helmers | B05B 13/0228 269/289 MR |
| 2010/0096906 A1 | 4/2010 | Brown | |

FOREIGN PATENT DOCUMENTS

WO     WO2013019802     2/2013

* cited by examiner

*Primary Examiner* — S. Joseph Morano
*Assistant Examiner* — Jean Charleston

(57) ABSTRACT

A shield for a rim of a vehicle wheel for covering a rim during treatment of a tire mounted on the rim includes a panel that is circularly shaped and rigid. The panel is dimensioned such that the panel is configured to abut to a rim of a vehicle wheel to substantially cover the rim while leaving a tire attached to the rim exposed for treatment. A brace is pivotally coupled to the panel proximate to a center of the panel. The brace is configured to extend between the panel and a surface upon which the vehicle wheel rests, retaining the panel in abutment to the rim of the vehicle wheel. The improvement is the brace positioned on the panel, allowing the panel to be retained in abutment to the rim without further action by a user.

11 Claims, 4 Drawing Sheets

SHIELD FOR A RIM OF A VEHICLE WHEEL

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98.

The disclosure and prior art relates to shields and more particularly pertains to a new shield for covering a rim during treatment of a tire mounted on the rim.

BRIEF SUMMARY OF THE INVENTION

An embodiment of the disclosure meets the needs presented above by generally comprising a panel that is circularly shaped and rigid. The panel is dimensioned such that the panel is configured to abut to a rim of a vehicle wheel to substantially cover the rim while leaving a tire attached to the rim exposed for treatment. A brace is pivotally coupled to the panel proximate to a center of the panel. The brace is configured to extend between the panel and a surface upon which the vehicle wheel rests, retaining the panel in abutment to the rim of the vehicle wheel. The improvement is the brace positioned on the panel, allowing the panel to be retained in abutment to the rim without further action by a user.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
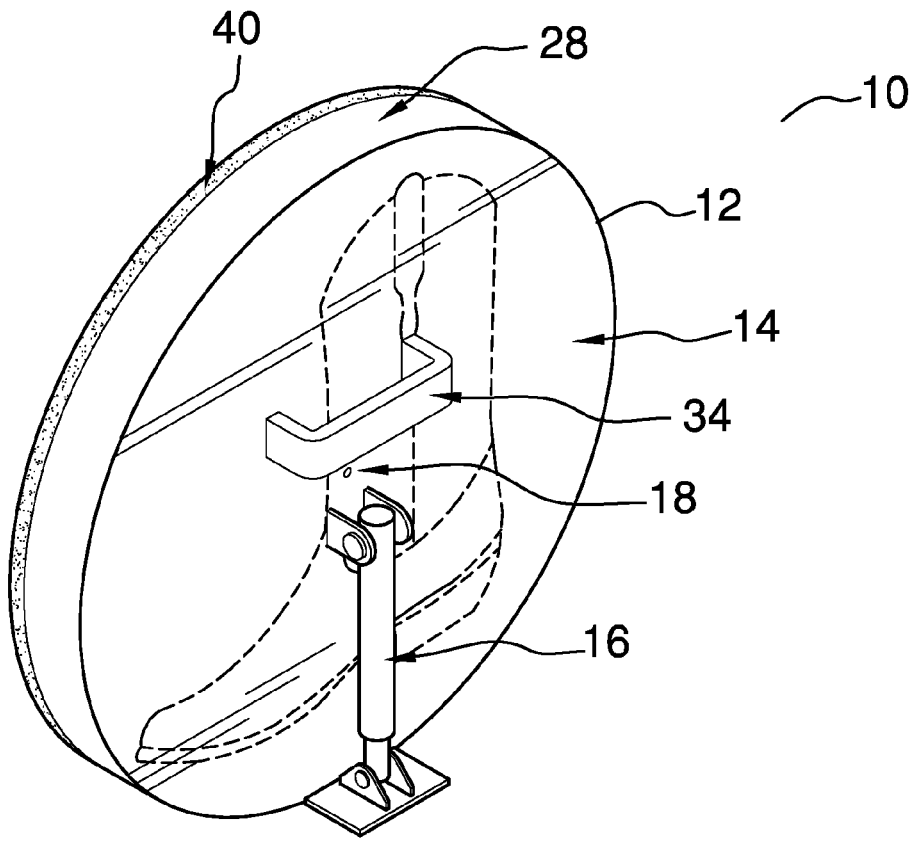
FIG. 1 is an isometric perspective view of a shield for a rim of a vehicle wheel according to an embodiment of the disclosure.
Figure 2:
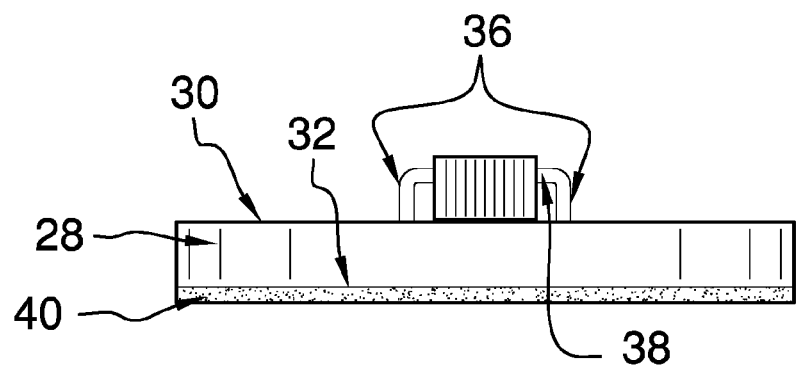
FIG. 2 is a bottom view of an embodiment of the disclosure.
Figure 3:
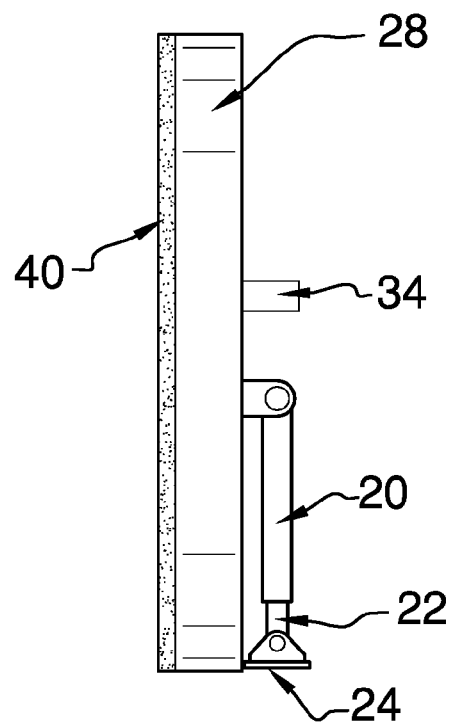
FIG. 3 is a side view of an embodiment of the disclosure.
Figure 4:
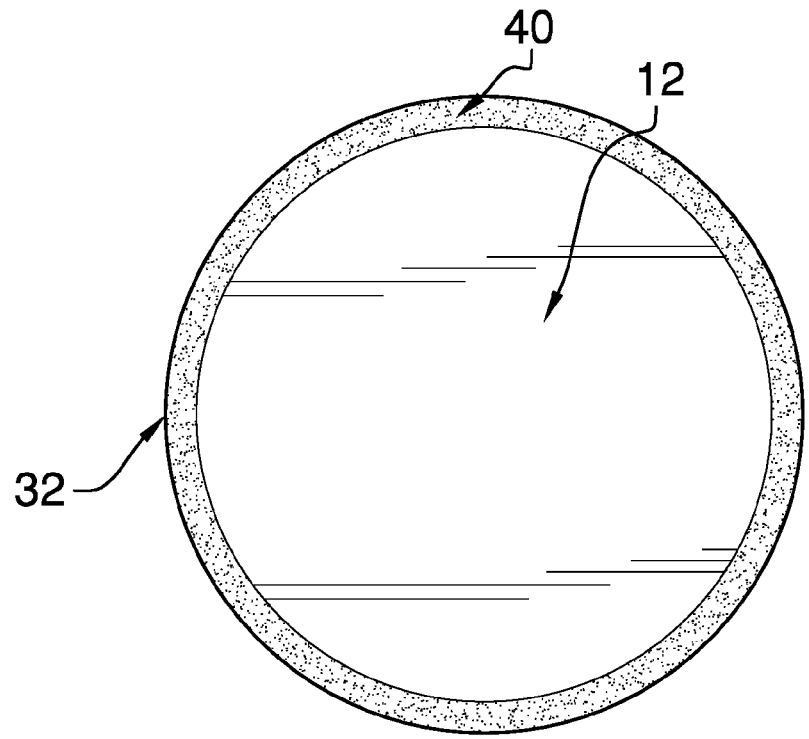
FIG. 4 is a back view of an embodiment of the disclosure.
Figure 5:
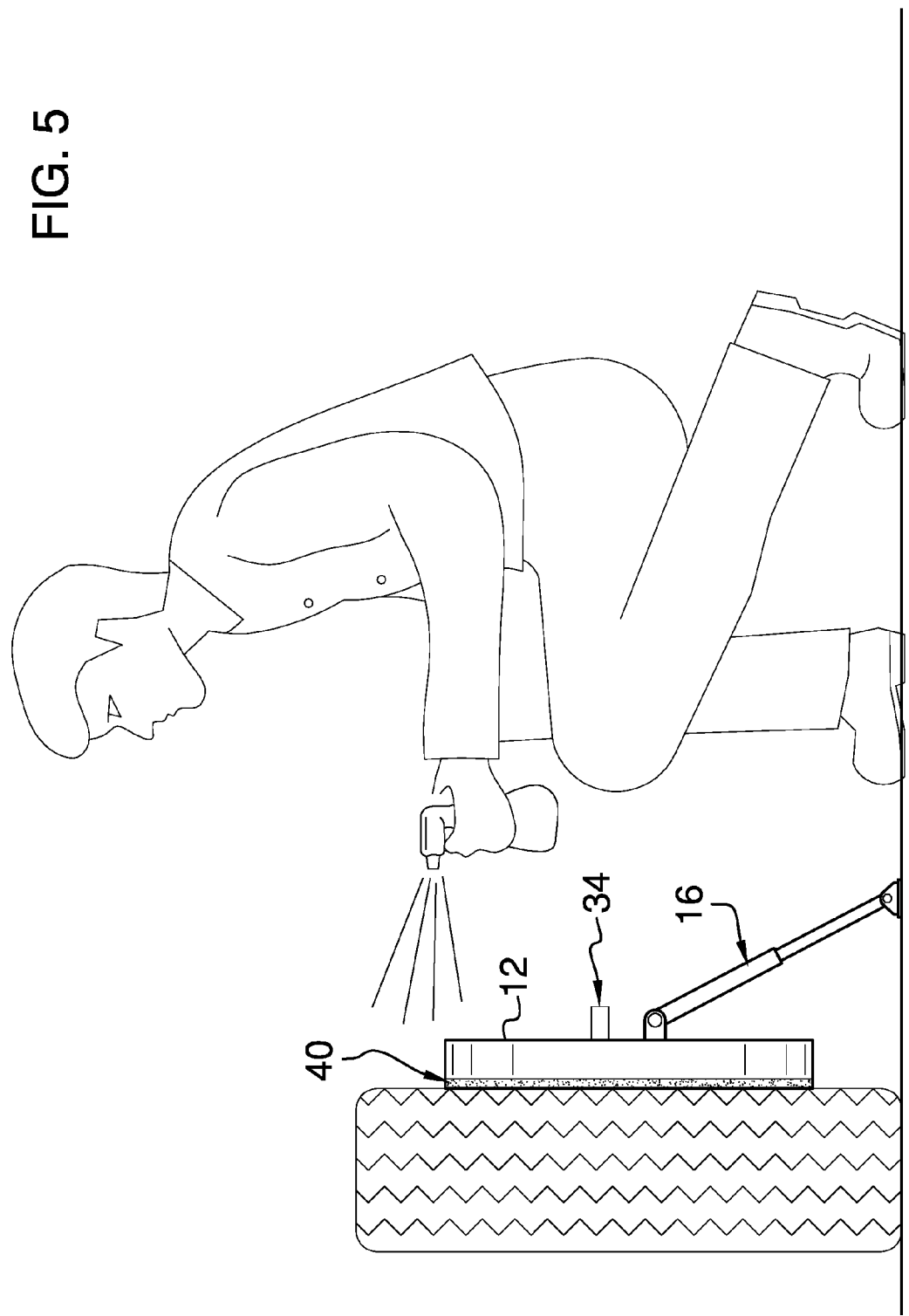
FIG. 5 is an in-use view of an embodiment of the disclosure.
Figure 6:
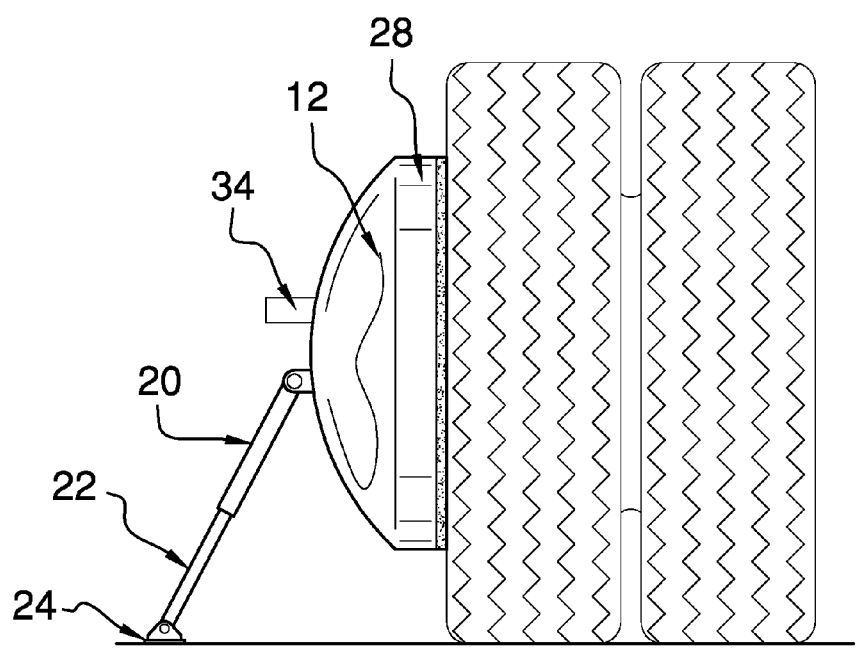
FIG. 6 is an in-use view of an embodiment of the disclosure.

With reference now to the drawings, and in particular to FIGS. 1 through 6 thereof, a new shield embodying the principles and concepts of an embodiment of the disclosure and generally designated by the reference numeral 10 will be described.

As best illustrated in FIGS. 1 through 6, the shield for a rim of a vehicle wheel 10 generally comprises a panel 12 that is circularly shaped and rigid. The panel 12 is dimensioned such that the panel 12 is configured to abut to a rim of a vehicle wheel to substantially cover the rim while leaving a tire attached to the rim exposed for treatment. In one embodiment, the panel 12 is domed, such that an outer surface 14 of the panel 12 is concavely shaped.

A brace 16 is pivotally coupled to the panel 12 proximate to a center 18 of the panel 12. The brace 16 is positioned on the panel 12 and is configured to extend between the panel 12 and a surface upon which the vehicle wheel rests to retain the panel 12 in abutment to the rim of the vehicle wheel.

In one embodiment, the brace 16 comprises a first rod 20 that is pivotally coupled to the panel 12, a second rod 22 that is selectively extensible from the first rod 20, and a plate 24 that is pivotally coupled to a terminus 26 of the second rod 22 distal from the first rod 20. The second rod 22 is positioned to extend from the first rod 20 such that the plate 24 is configured to rest substantially horizontally on the surface upon which the vehicle wheel rests. The first rod 20 and the second rod 22 are configured to retain the panel 12 in abutment to the rim of the vehicle wheel.

A wall 28 is coupled to and extends transversely from a perimeter 30 of the panel 12, defining a circumference 32 of the wall 28. The wall 28 is positioned on the panel 12 such that the circumference 32 is configured to abut to the rim. The wall 28 extends from the panel 12 such that the wall 28 is substantially perpendicular to the rim of the vehicle wheel when the circumference 32 is abutted to the rim.

A handle 34 is coupled to and positioned on the panel 12. The handle 34 is positioned on the panel 12 and is configured to be grasped by a hand of a user to place the panel 12 in abutment to the rim for the treatment of the tire. The handle 34 also is configured to be grasped by the hand of the user to remove the panel 12 from the rim upon completion of the treatment of the tire. The handle 34 is positioned proximate to the center 18 of the panel 12. The handle 34 comprises a pair of first bars 36, which is coupled to and extends transversely from the panel 12, and a second bar 38 that is coupled to and extends between the first bars 36 distal from the panel 12. The second bar 38 is positioned on the first bars 36 such that the handle 34 is configured for insertion of fingers of the hand of the user between the panel 12 and the second bar 38.

A gasket 40 is coupled to the circumference 32 of the wall 28. The gasket 40 is positioned on the wall 28 and is configured to reversibly and sealably couple the wall 28 to the rim of the vehicle wheel, such that materials employed by the user in the treatment of the tire attached to the rim do not come into contact with the rim. The gasket 40 is pliable.

The present invention also anticipates a plurality of images positioned on the panel 12.

In use, the handle 34 is positioned on the panel 12 such that the handle 34 is configured to be grasped by the hand of the user to place the panel 12 in abutment to the rim. The panel 12 substantially covers the rim while leaving the tire attached to the rim exposed for the treatment of the tire. The handle 34 also is configured to be grasped by the hand of the user to remove the panel 12 from the rim upon completion of the treatment of the tire. The second rod 22 is positioned to extend from the first rod 20, and the plate 24 is configured to rest substantially horizontally on the surface upon which the vehicle wheel rests. The first rod 20 and the second rod 22 are configured to retain the panel 12 in abutment to the rim of the vehicle wheel without further action by the user.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A shield for a rim of a vehicle wheel comprising:
   a panel, said panel being circularly shaped and rigid, wherein said panel is dimensioned such that said panel is configured for abutment to a rim of a vehicle wheel, wherein said panel substantially covers the rim while leaving a tire attached to the rim exposed for treatment;
   a brace pivotally coupled to said panel proximate to a center of said panel, wherein said brace is positioned on said panel such that said brace is configured to extend between said panel and a surface upon which the vehicle wheel rests, wherein said panel is retained in abutment to the rim of the vehicle wheel; and
   wherein the improvement is said brace being positioned on said panel, such that said panel is configured to be retained in abutment to the rim without further action by a user, wherein said panel substantially covers the rim while leaving the tire attached to the rim exposed for treatment.

2. The shield of claim 1, further including said brace comprising:
   a first rod pivotally coupled to said panel;
   a second rod selectively extensible from said first rod;
   a plate pivotally coupled to a terminus of said second rod distal from said first rod; and
   wherein said second rod is positioned to extend from said first rod such that said plate is configured to rest substantially horizontally on the surface upon which the vehicle wheel rests, wherein said first rod and said second rod are configured to retain said panel in abutment to the rim of the vehicle wheel.

3. The shield of claim 1, further including a wall coupled to and extending transversely from a perimeter of said panel defining a circumference of said wall, wherein said wall is positioned on said panel such that said circumference is configured for abutment to the rim.

4. The shield of claim 3, further including said wall extending from said panel such that said wall is substantially perpendicular to the rim of the vehicle wheel when said circumference is abutted to the rim.

5. The shield of claim 1, further including said panel being domed, such that an outer surface of said panel is concavely shaped.

6. The shield of claim 1, further including a handle coupled to and positioned on said panel, wherein said handle is positioned on said panel such that said handle is configured for grasping by a hand of the user to place said panel in abutment to the rim for treatment of the tire and to remove said panel from the rim upon completion of treatment of the tire.

7. The shield of claim 6, further including said handle being positioned proximate to said center of said panel.

8. The shield of claim 6, further including said handle comprising:
   a pair of first bars coupled to and extending transversely from said panel;
   a second bar coupled to and extending between said first bars distal from said panel; and
   wherein said second bar is positioned on said first bars such that said handle is configured for insertion of fingers of the hand of the user between said panel and said second bar.

9. The shield of claim 3, further including a gasket coupled to said circumference of said wall, wherein said gasket is positioned on said wall such that said gasket is configured to reversibly and sealably couple said wall to the rim of the vehicle wheel, such that materials employed by the user in the treatment of the tire attached to the rim do not come into contact with the rim.

10. The shield of claim 9, further including said gasket being pliable.

11. A shield for a rim of a vehicle wheel comprising:
    a panel, said panel being circularly shaped and rigid, wherein said panel is dimensioned such that said panel is configured for abutment to a rim of a vehicle wheel, wherein said panel substantially covers the rim while leaving a tire attached to the rim exposed for treatment, said panel being domed, such that an outer surface of said panel is concavely shaped;
    a brace pivotally coupled to said panel proximate to a center of said panel, wherein said brace is positioned on said panel such that said brace is configured to extend between said panel and a surface upon which the vehicle wheel rests, wherein said panel is retained in abutment to the rim of the vehicle wheel, said brace comprising:

a first rod pivotally coupled to said panel, a second rod selectively extensible from said first rod, a plate pivotally coupled to a terminus of said second rod distal from said first rod, and wherein said second rod is positioned to extend from said first rod such that said plate is configured to rest substantially horizontally on the surface upon which the vehicle wheel rests, wherein said first rod and said second rod are configured to retain said panel in abutment to the rim of the vehicle wheel;

a wall coupled to and extending transversely from a perimeter of said panel defining a circumference of said wall, wherein said wall is positioned on said panel such that said circumference is configured for abutment to the rim, said wall extending from said panel such that said wall is substantially perpendicular to the rim of the vehicle wheel when said circumference is abutted to the rim;

a handle coupled to and positioned on said panel, wherein said handle is positioned on said panel such that said handle is configured for grasping by a hand of the user to place said panel in abutment to the rim for treatment of the tire and to remove said panel from the rim upon completion of treatment of the tire, said handle being positioned proximate to said center of said panel, said handle comprising a pair of first bars coupled to and extending transversely from said panel, said handle comprising a second bar coupled to and extending between said first bars distal from said panel, wherein said second bar is positioned on said first bars such that said handle is configured for insertion of fingers of the hand of the user between said panel and said second bar;

a gasket coupled to said circumference of said wall, wherein said gasket is positioned on said wall such that said gasket is configured to reversibly and sealably couple said wall to the rim of the vehicle wheel, such that materials employed by the user in the treatment of the tire attached to the rim do not come into contact with the rim, said gasket being pliable; and wherein said handle is positioned on said panel such that said handle is configured for grasping by a hand of the user to place said panel in abutment to the rim for treatment of the tire and to remove said panel from the rim upon completion of treatment of the tire, wherein said second rod is positioned to extend from said first rod such that said plate is configured to rest substantially horizontally on the surface upon which the vehicle wheel rests, wherein said first rod and said second rod are configured to retain said panel in abutment to the rim of the vehicle wheel without further action by a user, wherein said panel substantially covers the rim while leaving the tire attached to the rim exposed for treatment.

\* \* \* \* \*